United States Patent [19]

Visser

[11] Patent Number: 4,941,551

[45] Date of Patent: Jul. 17, 1990

[54] VEHICLE SERVICE AREA FLOOR MAT

[76] Inventor: Douglas L. Visser, 4305 Highway 200 East, Sandpoint, Id. 83864

[21] Appl. No.: 354,382

[22] Filed: May 19, 1989

[51] Int. Cl.⁵ .................................................. F16N 31/00
[52] U.S. Cl. .................................................. 184/106
[58] Field of Search .......................................... 184/106

[56] References Cited

U.S. PATENT DOCUMENTS

| | | | |
|---|---|---|---|
| 2,497,565 | 2/1950 | Stark | 254/1 |
| 4,246,982 | 1/1981 | Pretnick | 184/106 |
| 4,315,561 | 2/1982 | Partridge | 184/106 |
| 4,392,552 | 7/1983 | Partridge | 184/106 |
| 4,484,661 | 11/1984 | Evenson | 184/106 |
| 4,671,024 | 6/1987 | Schumacher | 52/2 |

*Primary Examiner*—Douglas Hart
*Attorney, Agent, or Firm*—Henderson & Sturm

[57] ABSTRACT

A vehicle maintenance area service area mat. The mat includes a rectangular shaped body portion with a textured apron area disposed inwardly of the edges on the top of the body portion. A center recessed portion is disposed inwardly from the apron area and tapers downwardly toward a low end of the body portion. A fluid collecting means is disposed at the low end of the center portion. A plurality of projections extend downwardly from the bottom of the body portion to elevate the mat slightly above the floor.

12 Claims, 2 Drawing Sheets

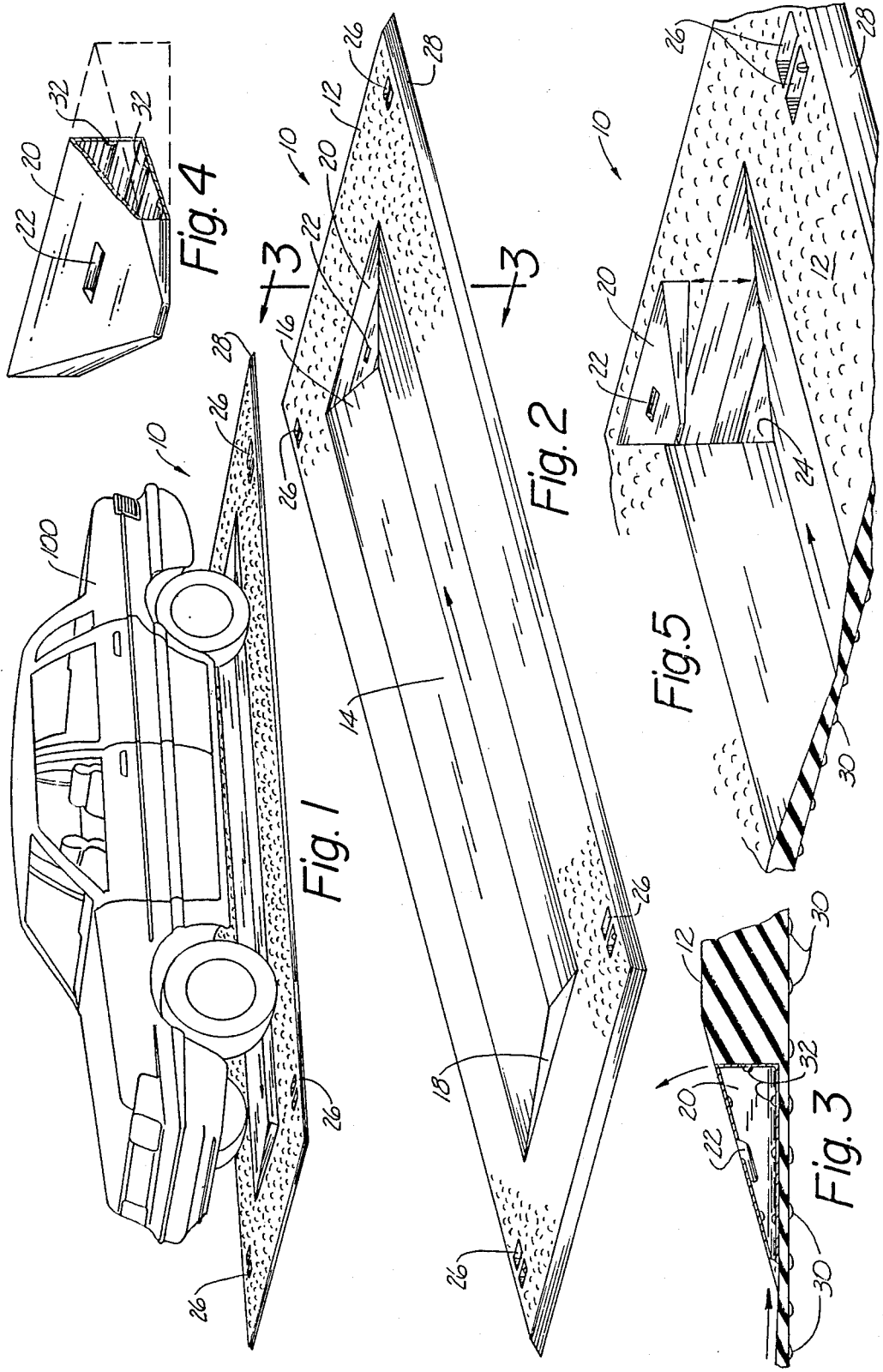

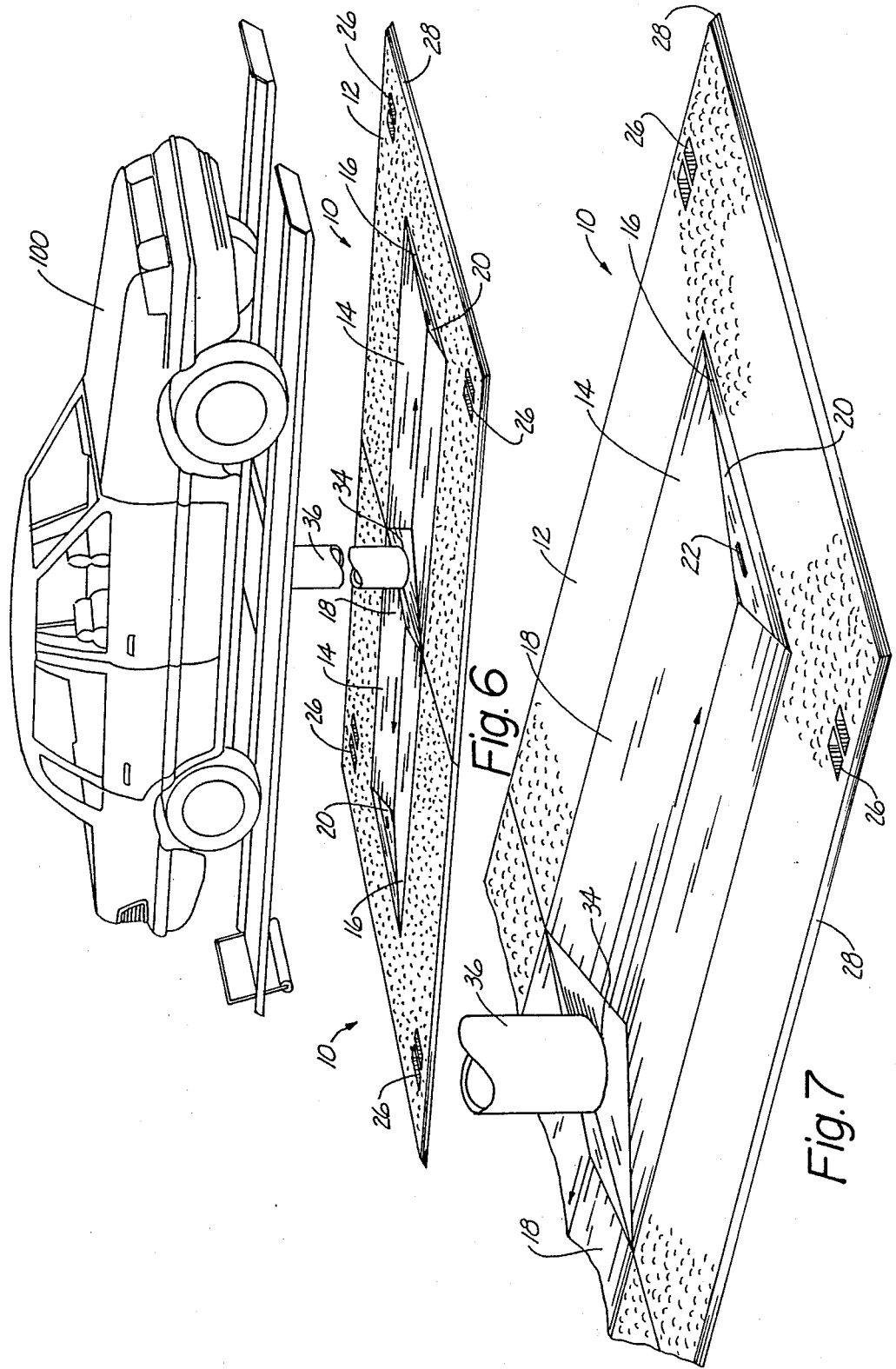

VEHICLE SERVICE AREA FLOOR MAT

TECHNICAL FIELD

This invention relates to mats for use in vehicle service areas.

BACKGROUND ART

Vehicle maintenance service areas are usually untidy in appearance due to the fluid spills around the service area. When a mechanic withdraws the fluid from a vehicle it is usually collected in a drip pan. The dripping from an elevated position spatters around the area of the vehicle causing unsightly oil marks on the cement and a hazard to the mechanic due to slippery conditions on the cement caused by the spatters.

It is well known that working on a solid concrete slab is very tiring to the legs, feet and back of a mechanic. When a mechanic works on a vehicle, often times their tools fall from their hands and fall down into the pits making retrieval messy and time consuming.

Those concerned with these and other problems recognize the need for an improved vehicle maintenance service area mat.

DISCLOSURE OF THE INVENTION

The present invention provides a vehicle maintenance area service area mat. The mat includes a rectangular shaped body portion with a textured apron area disposed inwardly of the edges on the top of the body portion. A center recessed portion is disposed inwardly from the apron area and tapers downwardly toward a low end of a body portion. A fluid collecting means is disposed at the low end of the center portion. A plurality of projections extend downwardly from the bottom of the body portion to elevate the mat slightly above the floor.

The safety service mat is designed to be used by any auto service industry. Its purpose is to maintain a cleaner work area and help prevent worker fatigue, slipping, and accidents. The mat is designed of rubber material with a gritty top apron surface and a knobby bottom surface. Two embodiments are disclosed; one is a drive on model, and the other is a model to be placed under a single post hoist.

The drive on model is approximately sixteen feet long, nine feet wide, and approximately one inch thick. It includes a fluid collecting pan made of plastic with reinforcement ribs inside it. The pan is located in a cavity in the low end of the mat and is used to collect any fluids spilled from the vehicle. The pan has a built in handle that is positioned towards the front so it rotates automatically when it is picked up, and the fluids will be in the bottom and be able to be carried to their proper disposal area. The mat has a eighteen inch flat apron area around it. This is for the mechanic to stand on to perform work on the vehicle. The center recessed area is tapered downward toward the pan. This allows any liquids to flow into the pan. A tapered shoulder, or edge, is provided to prevent a tripping hazard. It also has pins molded into the corners to receive a hook to move the mat.

The hoist style mat is made like the drive on mat except it is one half as long and has a square edge with a half circle notch removed. This allows two of these mats to be placed together around a post hoist to form a full sized mat with the fluids running to each low end in separate pans.

The mat center recessed area could be a dark gray color with the outer border, or edge, being a safety yellow color. The gray color is to disguise stains and fluids which will keep work areas looking cleaner. The outer border is safety yellow, warning anyone walking in the area that there is an uneven surface. The bottom of the mat will have short projections or knobs on it causing the mat to be raised slightly off the floor, thus allowing some air circulation to prevent condensation and moisture to be held between the mat and the floor.

The safety service mat could be useful in all phases of the automotive service industry since it is made out of rubber allowing it to be durable, flexible and to eliminate a technician from working on a hard cement floor throughout their shift. This will lessen fatigue and leg and back pains, therefore, creating a more productive work force. It will have a gritty textured surface that will drastically reduce slipping and falling injuries and accidents of technicians. All fluids dripped and spilled from a vehicle will be contained in the pan, to be disposed of easily and properly in an environmentally safe procedure.

This mat is an attractive, useful and safe addition to all light vehicle service facilities. It is attractive and safety oriented. It is also an environmental asset to help contain vehicle fluids to be disposed of properly and being designed to help all repair stations save time and money in clean up activities.

An object of the present invention is the provision of an improved vehicle area service mat that will maintain a cleaner work area.

Another object of the present invention is to provide a mat that will prevent worker fatigue, slipping and accidents.

A further object of the invention is the provision of a mat that is easy to use.

Still another object of the present invention is to provide a mat that is inexpensive to manufacture.

A still further object of the present invention is the provision of a mat that will allow ease in collecting and disposal of fluids from a vehicle.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of an automobile on a drive on mat of the present invention;

FIG. 2 is a perspective view of the present invention showing the textured apron and the recessed center portion;

FIG. 3 is a side elevation sectional view of the fluid collecting means taken along line 3—3 of FIG. 2;

FIG. 4 is a perspective view of the fluid collecting means with an end portion cutaway to show the interior of the collecting means;

FIG. 5 is a partial perspective view of the mat of the present invention showing the removable receptacle positioned above the cavity in the lower end of the mat;

FIG. 6 is a perspective view of another embodiment of the present invention wherein a pair of mats is disposed around a lift in the service area; and FIG. 7 is a partial perspective view of the pair of mats.

BEST MODE FOR CARRYING OUT THE INVENTION

Referring now to the drawings, wherein like reference numerals designate identical or corresponding parts throughout the several views, FIG. 1 shows one embodiment of the vehicle service area floor mat (10) of the present invention with a vehicle (100) driven over the mat (10) for service. This embodiment of the mat (10) is used by a mechanic with a creeper (not shown) for easy access to the underside of a vehicle (100).

FIG. 2 depicts the rectangular shaped mat (10) and includes a textured apron area (12) extending inwardly from the edges approximately eighteen inches, on the top of the mat (10). A center portion (14) is recessed and is disposed inwardly from the textured area (12). The mat (10) is sloped such that one end (16) is lower than the opposite end (18). Seated in the low end (16) is a fluid collecting means or pan (20) which has a handle (22) formed thereon for facilitating insertion of and removal of the pan (20) in a cavity (24) of the lower end (16). On each side and end of the mat (10) at the top outer edges are hook receiving pins (26) to aid in moving the mat (10) for cleaning, etc. Extending around the periphery of the mat (10) are beveled edges (28) to provide a gradual transition and prevent tripping when walking near the mat (10).

FIG. 3 shows the pan (20) seated within the cavity (24) in proper position in the lower end (16) of the mat (10). Also shown are the projections (30) on the bottom of the mat (10) which keep the mat (10) raised above a floor level to allow air circulation under the mat (10). FIG. 4 shows the interior (32) of the pan (20). Support ribs (32) are disposed in the interior of the pan (20) for stability.

Referring now to FIGS. 6 and 7, an alternate embodiment of the mat (10) is shown. The embodiment depicted in FIGS. 6 and 7 is used by a mechanic while allowing the mechanic to perform maintenance on the underside of the vehicle by standing under the vehicle, the vehicle being raised by a hoist (36), which is well known in the art. The mat (10) is made in two pieces with a notch (34) formed to fit around the lifting cylinder of the hoist (36). The two mats (10) fit together around the hoist (36) and allow a mechanic easy access to the underside of a vehicle when the hoist (36) is in its upwardly extended position. Fluid collecting means (20) are located in each low end (16) of the recessed portion (14) of each mat (10) to allow collection of fluid from either end of a vehicle (100).

In use of the embodiment as depicted in FIG. 1, a vehicle (100) is driven onto the mat (10) for service. The vehicle (100) is centered over the recess area (14). The mechanic has access to the underside of the vehicle (100) by using a creeper (not shown). Any fluids dripping from the vehicle (100) drains into the recess (14) and because the mat (10) has a lower end (16) the fluid will run to the lower end (16) and into the removable receptacle (20). After servicing the vehicle (100) the mechanic drives the vehicle (100) off the mat (10). The mechanic then grabs handle (22) of the removable receptacle (20) and lifts it up and out of the cavity (24) in the lower end (16). The fluid in the receptacle (20) is then disposed of in an appropriate manner. The receptacle (20) is then cleaned and replaced in the cavity (24) in the lower end (16) of the mat (10) such that the top surface conforms to the contour of the recessed area (14) in the vicinity of the low end (16).

To use the pair of mats (10) as depicted in FIGS. 6 and 7, a vehicle (100) is driven onto a hoist (36) which lies directly over the mat (10). The hoist (36) is lifted to its uppermost position to allow a mechanic to service the area under the vehicle (100). The textured apron area (12) of the mat (10) allows the mechanic to have a smooth, comfortable area on which to work. The textured area (12) alleviates worker fatigue, slipping and accidents. The projections (30) on the bottom of the mat (10), in both embodiments, keep the mat (10) from slipping and shifting its position on the work area. Projections (30) also allow air to circulate beneath the mat and keep condensation from collecting on the concrete floor under the mat. The beveled edges (28) around the entire periphery of the mat (10) prevent tripping hazards by the mechanic. It is to be understood that the edges (28) could be brightly colored to provide an additional warning to prevent accidents. To move the mat (10) for periodic cleaning, hooks (not shown) are placed to engage hook receiving pins (26) on each side of the mat (10) and the mat (10) is easily dragged out of the service area.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A service area mat for use on a floor in a vehicle maintenance area, said mat comprising:
   a rectangular shaped body portion having a top, a bottom and edges;
   a textured apron area disposed inwardly of the edges of the top of said body portion;
   a center recessed portion disposed inwardly from said apron area and being tapered downwardly toward a low end of said body portion;
   fluid collecting means disposed at said low end of said center portion; and
   a plurality of projections extending downwardly from said bottom of said body portion.

2. The service area mat of claim 1 wherein said textured apron area on said top extends inwardly from said edges approximately eighteen inches.

3. The service area mat of claim 1 wherein said edges are beveled.

4. The service area mat of claim 1 wherein said projections on said bottom maintain said mat raised above the floor.

5. The service area mat of claim 1 wherein said downwardly tapered recessed center portion allows fluids to flow toward said low end.

6. The service area mat of claim 1 wherein said fluid collecting means is a removable receptacle.

7. The service area mat of claim 6 wherein said receptacle further includes a handle formed in the top surface thereof.

8. The service area mat of claim 6 wherein said receptacle is disposed in a cavity located at said low end.

9. The service area mat of claim 6 wherein said receptacle further includes support ribs in the interior thereof.

10. The service area mat of claim 8 wherein said receptacle is shaped such that the top surface conforms to the contour of said recessed area in the vicinity of said low end.

11. The service area mat of claim 1 further including a hook receiving means disposed in the top of said body portion to allow convenient grasping of and movement of said mat.

12. The service area mat of claim 1 wherein said body portion includes a notch at an end opposite said low end, said notch being disposed to abut a section of a vertical cylinder forming part of a service lift.

* * * * *